UNITED STATES PATENT OFFICE.

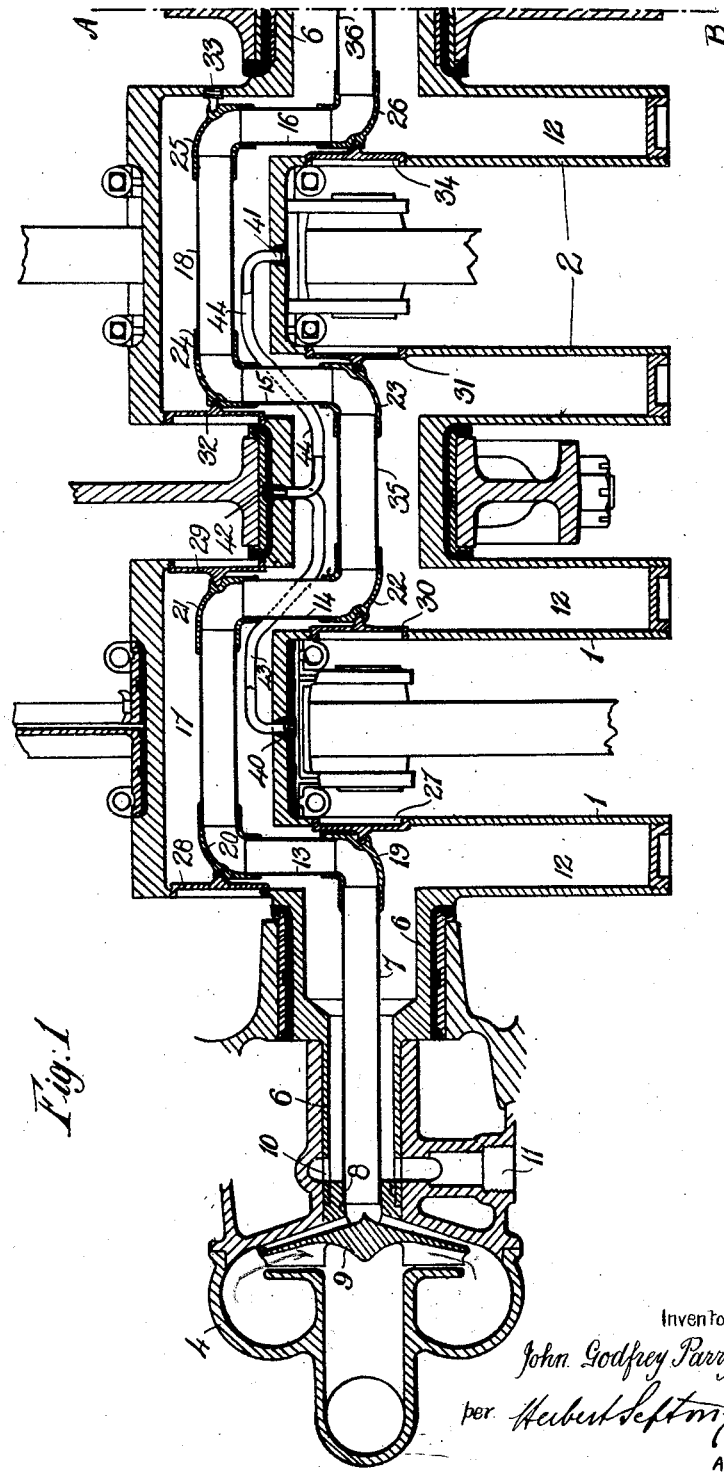

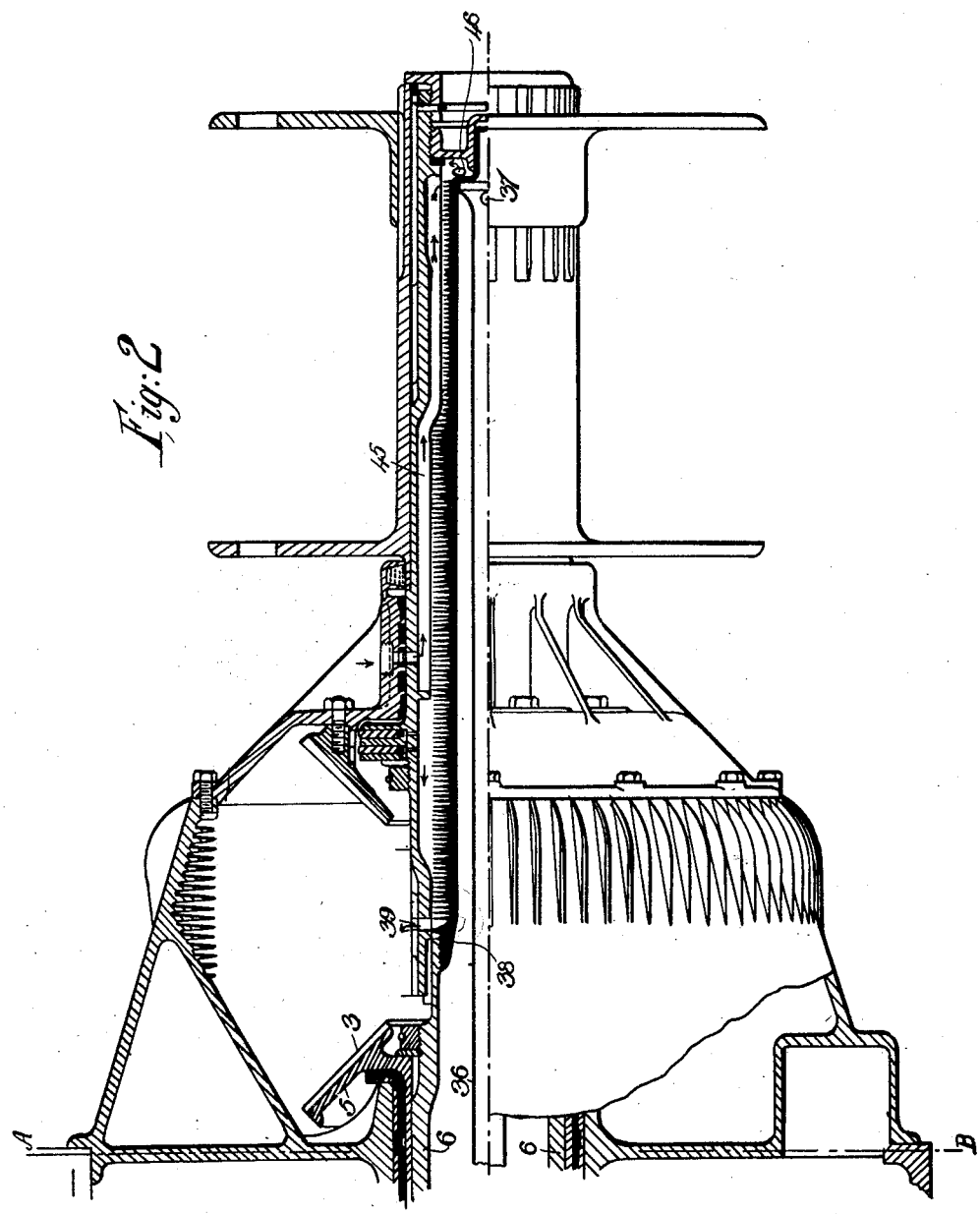

JOHN GODFREY PARRY THOMAS, OF BARNES, ENGLAND.

INTERNAL-COMBUSTION ENGINE.

1,346,280.  Specification of Letters Patent.  Patented July 13, 1920.

Application filed March 25, 1918. Serial No. 224,537.

*To all whom it may concern:*

Be it known that I, JOHN GODFREY PARRY THOMAS, a subject of the King of Great Britain, and residing at Caversham Lodge, Vine Road, Barnes, Surrey, England, have invented new and useful Improvements in and Connected with Internal-Combustion Engines Especially for Use on Aircraft, of which the following is a specification.

This invention relates to the lubrication, and the cooling for purposes of lubrication, of the crank shafts of internal combustion engines, more particularly of those used on air-craft. It is found difficult to force oil through the crank shaft bearing at a sufficient rate to prevent considerable heating, and if the oil is once allowed to become much heated there is great trouble in cooling it again on account of its low heat conductivity.

My invention designs to overcome these difficulties by providing improved means for cooling the crank shaft bearing and combining therewith means for cooling the oil.

My invention comprises a crank shaft of which the shaft itself, as also the cranks and crank pins are bored, and receive a tube of less diameter than the bore, which is supported by plates screwing into and closing the bore of the shaft and crank pin and engaging its angles. At one end the tube communicates with the bore of the shaft.

My invention further comprises the combination with a hollow crank shaft and inner tube of a centrifugal pump fast upon and driven by the shaft, and so associated with the tube as to draw cooling fluid through it and through the hollow space around it.

Yet another feature of my invention is the extension of the bored and water cooled shaft to serve for cooling the oil directly. To this end the extension of the shaft is formed with fins, the preferred form being continuous spiral fins; these are incased and oil is admitted to them at one end and leaves them at the other end to pass to the bearings. The water circulating in the shaft cools the fins and thereby cools the oil.

An example of construction of the invention is shown in longitudinal section in the accompanying drawings, Figure 1 showing its left hand portion and Fig. 2 its right hand portion, the line A—B defining where the figures join.

These drawings show a crank shaft for an aircraft engine; it has four cranks and its two crank pins are in line. It is immaterial to the invention how power is taken from the shaft; in the drawing it is shown to carry a bevel wheel 5 which is the first member of a reduction gear 3 not fully illustrated. The shaft 6 and the crank pins are drilled longitudinally; the cranks 1, 1, and 2, 2, are also hollowed from the lower ends 12 seen in the figure. Lengths of copper tube are mounted in these hollow parts; 7, 35 and 36 in the portions of the crank shaft, 13, 14, 15, 16 in the cranks, 17, 18 in the crank pins. These are joined into a continuous channel by angle bends 19, 20—26. The bores of the shaft and crank pins are closed by plates 28, 29, 30, 31, 32 and 34, which screw into the bores and engage the angle pieces, thereby supporting the tube and spacing it within the hollow members. The supporting of the tube is completed by a boss 8 surrounding it at one end and fitting the bore of shaft 6, by a plug 33 engaging the elbow bend 25, and by the expansion of the tube 36 at its outer end to fit the bore of shaft 6. This flared or trumpet shaped end is perforated by apertures 37 which connect the interior of the tube with the hollow interior of the shaft and other members around it.

The boss 8 is so driven into the shaft 6 as to be rotated by it. The boss carries the blades 9 of a centrifugal pump 4 to which the tube 7 serves as suction inlet. The hollow shaft 6 adjacent the boss 8 is transversely perforated by ports 10 around its circumference through which fluid can pass to the interior of the shaft from the connection 11.

The pump 4 thus constitutes a means of circulating a cooling fluid throughout the whole length of the shaft. The fluid, commonly water, enters by connection 11, passes to the right in the figures outside the tubes 7, 13, 17, etc., enters the tube 36 by the openings 37, then returns through tubes 36, 16—8, from which last it is drawn by the pump blades 9.

This same cooling circulation is utilized to effect direct cooling of the oil. This purpose is subserved by the extension 38 of the shaft 6, the tube 36 being prolonged to the end of the extension so that the whole of it is subjected to cooling. The extension is formed with a large number of outwardly projecting fins, in spiral form. The fins are themselves incased. The oil is led to one end of them through the passage 45 and apertures 46, and travels along them, their spiral form and the rotation of the shaft assisting in its propulsion, till it reaches the other end where it leaves through passage 39. In its travel the oil is brought into intimate contact with the metal of the fins to which it yields up a large part of its heat, and this is conveyed away by the cooling medium circulating within the extension 38.

Tapering holes are drilled through the journal surfaces of the crank pins at 40 and 41, and through the journal surface of the crank shaft as seen at 42. Through these holes the journal surfaces are connected by copper tubes 43, 44, which extend from the one bearing to the other through the water-filled hollow interior of the shaft cranks and crank pins. A tight joint is made at the ends of the pipes 43, 44 by threaded taper plugs which expand the pipe end into the taper hole; the plugs being bored centrally to permit the passage of the oil through them.

What I claim is:—

1. In an internal combustion engine the combination with a hollow crank, crank shaft, and crank pin, of a tube supported within said crank, crank shaft, and crank pin, and communicating at one end with the interior hollow, a boss surrounding said tube at its other end and fast in said crank shaft, pump blades upon said boss adapted to draw fluid through said tube, and a fixed casing surrounding said blades.

2. In an internal combustion engine, the combination with a hollow crank shaft, crank and crank pin, of a tube within said hollow but not filling it, members screwing into said crank to engage and support said tube, and means for circulating water through said tube and through said hollow parts around said tube.

3. In an internal combustion engine, the combination with a hollow crank shaft, of radiating fins formed upon a portion of said hollow shaft, bearings for said shaft, means for circulating oil among said fins and through said bearings, and means for circulating water through said shaft to cool said bearings and said fins and thereby cool the oil.

4. In an internal combustion engine, the combination with a hollow crank shaft, of a spiral fin formed upon said shaft, a casing about said fins apertured to admit oil thereto at one end and permit egress therefrom at the other end, bearings for said shaft, and means for circulating water through said shaft to cool said bearings and said fins and thereby cool the oil.

5. In an internal combustion engine the combination with a hollow crank shaft, crank and crank pin, of a hollow extension upon said shaft, a tube extending through said crank, crank pin and shaft and extension thereof but not filling the hollow therein, radiating fins formed upon said extension of the shaft, bearings for said shaft, means for circulating oil among said fins and through said bearings, and means for circulating water through said tube and through the hollow crank crank pin and shaft around said tube to cool the bearings and said fins and thereby cool the oil.

6. In an internal combustion engine the combination with a hollow crank shaft crank and crank pin, of a hollow extension upon said shaft, a tube extending through said crank crank pin and shaft and extension thereof but not filling the hollow therein, of a spiral fin formed upon said extension of the shaft, bearings for said shaft, and means for circulating water through said tube and through the hollow crank crank pin and shaft around said tube to cool the bearings and said fins and thereby cool the oil.

7. In an internal combustion engine the combination with a hollow crank shaft crank and crank pin, of a hollow extension upon said shaft, a tube supported in and extending through said crank crank pin crank shaft and extension thereof and communicating at one end with the interior hollow, fins upon said extension of the shaft, bearings for said shaft, means for circulating oil among said fins and through said bearings, and a centrifugal pump secured upon said shaft at one end adapted to draw water through said tube and interior hollow to cool said bearing and said fins and thereby cool the oil.

8. In an internal combustion engine the combination with a hollow bored crank shaft crank and crank pin, of a tube extending throughout said hollow but not filling it and communicating with it at one end, plates screwing into said crank to close the bore in said crank pin and shaft and engaging and supporting said tube, and a centrifugal pump formed upon said shaft at one end adapted to draw water through said tube and surrounding hollow.

9. In an internal combustion engine the combination with a crank shaft having hollow cranks and a plurality of alined crank pins, said shaft and crank pins being bored throughout their length, of a tube extending throughout said crank shaft cranks and crank pins, plates screwing into said cranks to close the bores of said shaft and crank pins, and engaging and supporting said tube, and means for circulating water through said tube and through the hollow space around it.

In testimony whereof I sign my name to this specification in the presence of two subscribing witnesses.

JOHN GODFREY PARRY THOMAS.

Witnesses:
ERNOLD S. MOSELEY,
GEORGE WEAVER.